(12) United States Patent
Haddock

(10) Patent No.: US 6,226,151 B1
(45) Date of Patent: May 1, 2001

(54) CONTACT SLIDER FOR MAGNETO-RESISTIVE HEADS

(75) Inventor: Quinn Haddock, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/302,060

(22) Filed: Apr. 29, 1999

(51) Int. Cl.⁷ .................................................. G11B 5/60
(52) U.S. Cl. ................................. 360/236.6; 360/236.9; 360/237.1
(58) Field of Search ......................... 360/234.1, 234.2, 360/234.3, 235.4, 236.5, 236.6, 236.9, 237.1

(56) References Cited

U.S. PATENT DOCUMENTS

| | | | |
|---|---|---|---|
| 5,713,123 | * | 2/1998 | Toyoda et al. ................. 29/603.12 |
| 5,768,055 | * | 6/1998 | Tian et al. ........................ 360/103 |
| 5,771,570 | * | 6/1998 | Chhabra et al. ................ 29/603.06 |
| 5,835,305 | * | 11/1998 | Hamaguchi et al. ............. 360/103 |
| 5,859,748 | * | 1/1999 | Itoh .................................... 360/103 |
| 5,995,324 | * | 11/1999 | Haddock et al. ................. 360/103 |
| 6,016,239 | * | 1/2000 | Mizuno et al. ................... 360/104 |
| 6,040,959 | * | 3/2000 | Kobayashi et al. .............. 360/103 |
| 6,128,163 | * | 10/2000 | Haddock et al. .............. 360/237.1 |

FOREIGN PATENT DOCUMENTS

| | | | |
|---|---|---|---|
| 54-127310 | * | 10/1979 | (JP). |
| 4-114379 | * | 4/1992 | (JP). |
| 10-293922 | * | 11/1998 | (JP). |

* cited by examiner

Primary Examiner—Jefferson Evans
(74) Attorney, Agent, or Firm—David M. Sigmond

(57) ABSTRACT

A magnetic recording contact slider is disclosed which allows a magneto-resistive recording element to achieve a significantly reduced physical and magnetic spacing with a rigid magnetic recording disk in a disk drive, without resulting in thermal transients caused by sensor/disk contacts. The slider utilizes a high air-bearing surface curvature to reduce the static friction between the slider and the recording disk.

60 Claims, 2 Drawing Sheets

CONTACT SLIDER FOR MAGNETO-RESISTIVE HEADS

FIELD OF THE INVENTION

This invention relates to a slider design for contact operation in a recording system using a magneto-resistive transducer. More particularly, the present invention relates to a slider having a highly curved air-bearing surface to reduce slider/disk static friction in a contact magneto-resistive recording system.

BACKGROUND OF THE INVENTION

In a conventional magnetic recording system, the rotation of the rigid magnetic disk causes a transducer or magnetic recording head to be hydrodynamically lifted above the surface of the recording medium. The hydrodynamic lifting phenomena results from the flow of air produced by the rotating magnetic disk. This airflow causes the head to "fly" above the disk surface. Of course, when the rotation of the magnetic disk stops or slows, the head element is deprived of its aerodynamic buoyancy and lands on the surface of the disk.

Magnetic heads typically comprise a rectangular slider body onto which is attached a transducer device along one portion of the slider body. Normally, sliders are made of various ceramic materials. For instance, a composition of alumina and titanium-carbide is one of the more common slider materials in use today due to its relative wear resistance. A variety of other materials have also been used as well. There are typically two types of transducers for magnetic recording, thin film or magneto-resistive (MR). Thin-film transducers can read or write. An MR transducer can only read. Hence a second thin film transducer must be used in combination with an MR transducer for full read/write capabilities.

A primary goal of hard disk drives is to provide maximum recording density in the hard disk. It has been found that the recording density that can be achieved using a magnetic recording transducer depends, in part, on the distance between the recording medium of the hard disk and the magnetic recording transducer. A related goal is to increase reading efficiency or reduce read errors, while increasing recording density. Problems associated with attaining these goals may vary depending upon whether the drive utilizes a thin film transducer for both reading and writing, or a magneto-resistive transducer for reading and a thin film head for writing.

From a writing or recording density standpoint, the transducer is ideally maintained in direct contact with the recording medium of a hard disk. Recording density decreases as the write transducer is elevated above the disk surface. By providing zero separation distance between the magnetic recording transducer of the slider and the disk, high magnetic recording densities are achieved. However, the hard disk typically spins at about or in excess of 4,000 r.p.m. and the friction caused by the continuous direct contact between the slider and the transducer, on one hand, and the recording medium, on the other hand, can cause unacceptable wear in the recording medium, the slider and the transducer. Wear occurring in the recording medium can result in a loss of data. Wear occurring in the transducer can result in complete failure of the recording transducer requiring replacement of the slider housing the transducer, as well as loss of data.

A common approach to protecting the head/disk interface from excessive wear has been to coat the surface of the disk with a liquid lubricant. However, this can create an accumulation of debris on the head, including the lubricant and dust or dirt from the surrounding environment. Accumulation of such debris around the contact surface of the head leads to signal modulation caused by particle induced fluctuations in the head. Accumulation of debris and other particulate matter can also create a dramatic increase in the wear rate as the debris is captured in the friction zone between the slider and the disk. The presence of any liquid lubricant in the zone can magnify this effect dramatically.

To prevent undue wear of the recording medium and the slider and/or transducer while still maintaining acceptable recording density, the bottom surface of the slider is typically configured as an air bearing surface. High speed rotation of the disk causes a stream of air to flow along the surface of the disk. The air-bearing surface of the slider interacts with the flow of the air causing the slider to float about the hard disk surface. Hence, while the disk is spinning and the slider is positioned adjacent to the disk, the slider floats slightly above the disk, thereby substantially eliminating wear to either the disk or to the slider.

Although the conventional air-bearing surface slider design has been effective in preventing wear of the slider and/or transducer and the recording medium, optimum recording densities have been lost due to separation between the recording medium and the magnetic recording transducer of the slider.

From the standpoint of reading data from a magnetic disk, and similar to recording, reading efficiency decreases the farther the read element is from the disk. Because the signal to noise ratio decreases with increasing distance between the transducer and the disk, moving the transducer closer to the disk increases data storage bit density. Moreover, because MR transducers are more sensitive than thin film read elements, an MR transducer will read more efficiently, with less errors, than a thin film head at the same distance above the disk.

Conventional magneto-resistive elements disposed on sliders are designed with air bearing surfaces to fly above the surface of a rigid rotating magnetic recorded disk. Current disk drives with MR heads operate at an average head to disk physical spacing of approximately 40 nanometers, with distribution ranging up to 75 nanometers or more. This range of spacing is required to account for slider and disk drive manufacturing tolerances, such as in the actuator and disk/spindle interface, and environmental conditions such as altitude and temperature, which would cause the slider to fly too low and make contact with the rigid disk. Contact of the magneto-resistive MR transducer with the disk surface has proven to cause an undesirable thermal transient due to friction, commonly referred to as thermal asperity. Thus, unlike inductive heads which are able to tolerate disk contacts without generating signal transients, use of MR heads has required the MR heads to fly above the disk surface resulting in less efficient recording density.

When a hard drive is at rest, the slider is in contact with the disk. This creates a static friction between the slider and the disk. During the operation, this static friction must be overcome to allow the disk to spin. As expected, high static friction results in a large amount of power consumption by the hard disk drive to overcome this static friction. One method of reducing the hard disk drive's power consumption is to lower the static friction between the slider and the disk. Typically, this reduction in static friction is achieved by intentionally texturing the disk. This texturing introduces imperfection on the disk creating asperties or roughness on the surface of the disk. The asperities reduce the static friction by lowering the amount of surface area that is in contact with the slider. Unfortunately, however, the asperities vary the distances between the recording head and the recording medium which can effect reading and writing operations.

For a hard disk drive utilizing an (MR) transducer, a direct contact between the disk and the MR transducer can result in thermal transients which can result in incorrect data transfer. Thus, it is crucial to maintain separation between the disk and the MR transducer in a hard disk drive having a contact slider. But the disk asperities which are intentionally introduced to reduce the static friction can result in actual contact between the MR transducer and the disk, depending on the positioning of the MR transducer, causing transducer wear or thermal transients that can result in a complete failure of the recording transducer or inaccurate data transfer. One method of reducing this potential problem is to burnish the disk to remove asperities.

Based on the foregoing, a desirable solution would be to utilize a flying MR head transducer with as little spacing as possible between the disk surface and the transducer. With flying heads, however, the height is influenced in large part by the quality of the manufacturing process. Manufacturing tolerance includes the manufacturability of components such as the crown, camber, twist, etch depths of the slider, head-gimble interface, assembly tolerances and the very process of stacking and swaging parts together. If a precise suspension and alignment mechanism is required, such as with the transducer spaced only a few nanometers above the disk surface, the overall mechanical tolerances of various components must be correspondingly more precise. Such precision would be not only mechanically difficult, but exceedingly expensive.

Therefore, there is a need for a relatively simple and inexpensive contact slider with an MR transducer placed above the recording medium with a reduced static friction between the slider and a recording medium. There is also a need for burnishing the disk to reduce the disk asperities to levels below the MR transducer height.

OBJECTS OF THE INVENTION

It is an object of the present invention to utilize contact slider technology with MR transducer technology with reduced static friction, to achieve reduced magnetic spacing without generating detrimental thermal asperities.

SUMMARY OF THE INVENTION

One embodiment of the present invention provides a contact slider for use with a magneto-resistive transducer in a recording system. The slider of the present invention has a contact portion and a highly curved air-bearing surface.

The contact portion is in a substantially continuous contact with a recording medium when the recording medium is spinning in operation. The contact portion can provide a burnishing effect to remove at least a portion of disk asperities to levels below the magneto-resistive transducer height. In one particular embodiment of the present invention, the static friction between the contact portion and the recording medium is less than about 4 g.

A magneto-resistive transducer is positioned in the air-bearing surface of the slider such that it is located from about 1 nm to about 10 nm above the recording medium. This prevents physical contact between the transducer and the recording medium which may result in undue wear of the transducer. In addition, the transducer can be located laterally away from the contact portion such that a substantial portion of any debris which may be generated and/or accumulated during the initial operation of the recording system does not come in contact with the transducer.

Another embodiment of the present invention is a hard disk drive assembly which includes a head having the contact slider described above located on the bottom surface of the head, a recording medium, and a spin motor.

In yet another embodiment of the present invention, a method for transferring information with a rotating magnetic disk utilizing the contact slider is disclosed.

DETAILED DESCRIPTION OF THE PREFERRED EMBODIMENT

The present invention provides a method and apparatus for improving the use of magnetic-resistive heads in contact recording systems through reducing static friction between the slider and a recording medium. The present invention is particularly useful in a hard disk drive system which uses a magneto-resistive head to read information from a magnetic disk which is rotated by a spin motor.

Figure 1:
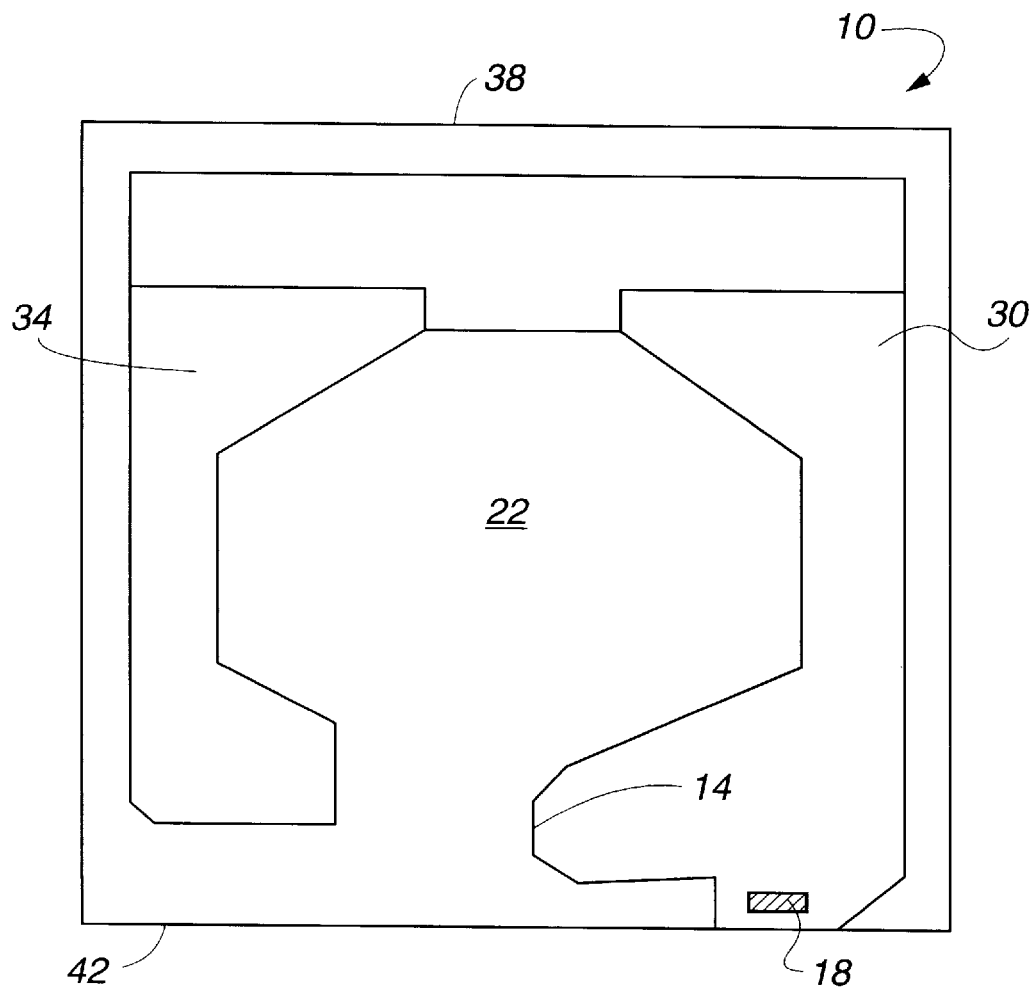
FIG. 1 is a bottom surface view of a slider of the present invention.
Figure 2:
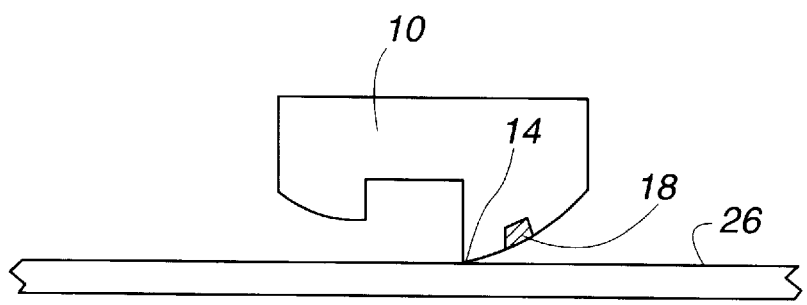
FIG. 2 is a rear view of a slider of the present invention.
Figure 3:
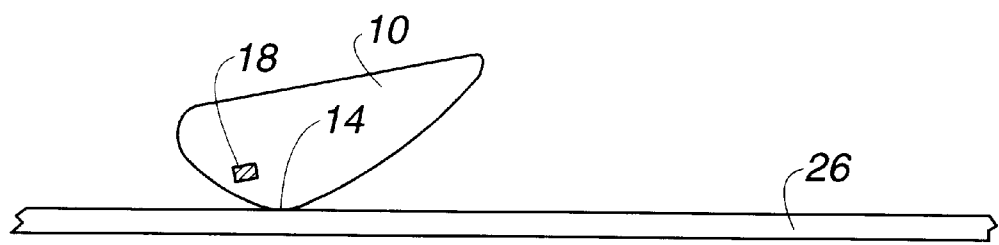
FIG. 3 is a side view of a slider of the present invention.
Figure 4:
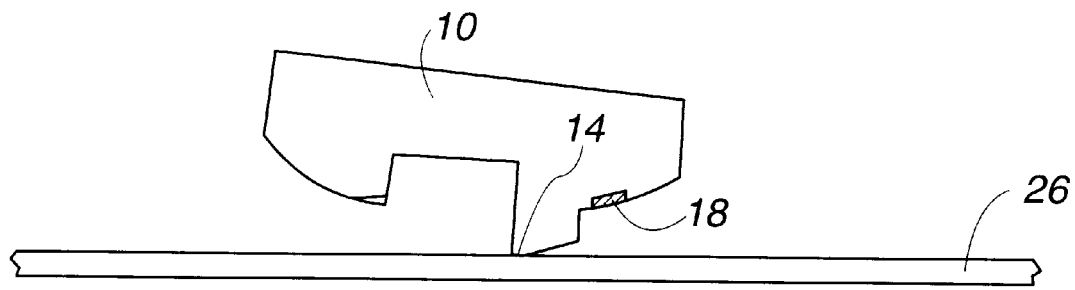
FIG. 4 is a rear view of a slider of the present invention having a magneto-resistive transducer located at a recessed portion of the slider.

The present invention will be described with regard to the accompanying drawings in FIGS. 1–3 which assist in illustrating various features of the invention. In one embodiment of the present invention, a slider 10 for positioning a transducer 18 relative to a recording medium 26 is provided. The slider 10 comprises an air-bearing surface 22 having a contact portion 14 and a magneto-resistive transducer 18 which is disposed generally lateral to the contact portion 14. Moreover, the MR transducer 18 can be placed in a recessed portion of the slider (not shown) such that when the contact portion 14 is in contact with the recording medium 26, the magneto-resistive transducer 18 is spaced above the recording medium 26. A recessed portion can be intentionally produced using any of the known methods including conventional slider lapping and cleaning techniques, polishing and sputter etching.

The slider 10 is made of a various ceramic materials. A composition of alumina and titanium-carbide is one of the more common slider materials in use today due to its relative wear resistance. This wear resistance property of alumina and titanium-carbide ceramic material can be used in the air-bearing surface of the slider 10 having a contact portion 14; however, this wear-resistance property also makes it more difficult to produce a recessed portion in the air-bearing surface of the slider 10. One can achieve having both wear-resistance property in a contact portion 14 and the ability to relatively easily introduce a recessed portion by having the slider 10 that is composed of at least two different materials. For example, the contact portion 14 of the slider 10 can be composed of a wear-resistant ceramic composition such as alumina-titanium-carbide, silicon carbide or a deposited film of carbon. Whereas, the portion of the air-bearing surface 22 which ultimately forms the recessed portion can comprise ceramic composition which can be selectively removed, for example, alumina.

The contact portion 14 can be designed to provide a burnishing effect to reduce asperities in the recording medium 26 to levels below the height of the MR transducer, providing a substantial reduction in the probability of transducer/medium contacts which can cause undesirable thermal transients of the MR transducer.

The slider 10 is designed to achieve a substantial reduction of static friction between the slider 10 and the recording medium 26 by the use of a highly curved air-bearing surface. Preferably, this design has a high curvature in both lateral and longitudinal directions, i.e., spherical. The lateral curvature prevents the transducer from physically touching the recording medium 26 which may have protrusions on its surface. Preferably, the longitudinal radius of curvature is from about 4 meters to about 7 meters, more preferably from about 4 meters to about 6 meters, and most preferably about 5 meters. A highly curved air-bearing surface results in a low amount of surface area contact between the slider and the disk, thus reducing the static friction. Currently, the static friction is reduced by intentionally texturing the disk to lower the amount of contact surface area between the disk and the slider. Thus, this high curvature of the air-bearing surface enables the reduction or elimination of the amount of texture required on the recording medium. Preferably the high curvature of the air bearing surface results in the static friction between the slider 10 and the recording medium 26 of less than about 4 g, more preferably less than about 3 g, and most preferably less than about 2 g.

In addition, the high curvature results in a high slider crown. A slider crown refers to the height of leading and trailing edges 38 and 42, respectively, relative to the surface of recording medium 26 when the recording medium is at rest. For a 50% form factor slider, the slider crown is at least about 75 nm, preferably at least about 100 nm, and more preferably at least about 125 nm. For a 30% form factor slider the slider crown is at least about 25 nm, preferably at least about 37 nm, and more preferably at least about 45 nm. A form factor slider refers to de facto industry standard slider configuration having a dimension of 0.159 inch (length)×0.125 inch (width)×0.034 inch (height).

The slider 10 can have one or more side rails (e.g., 30 and 34) and/or a center rail (not shown). Although the side rails are represented in FIG. 1 as being a straight edge, it can be any variety of shape such as a curve or a zig-zag shape.

The design of the air-bearing surface is selected such that the air-bearing surface does not generate an excessive amount of lift when the recording medium 26 is spinning. This helps maintain contact of the slider 10 with the recording medium 26.

To prevent excessive wear caused by the constant contact between the contact portion 14 and the recording medium 26, the contact portion 14 is composed of a wear-resistant material as discussed above. In addition, the recording medium 26 can be coated with a lubricant to reduce the friction. Alternatively, the recording medium can be coated with a protective carbon overcoat.

In a particular embodiment, a slider having an air-bearing surface shape of the present invention provides a trailing edge region on the side rail 30, extending toward the center of the slider. A high curvature spherical shape of the slider 10 result in the positioning of the MR transducer 18 at a desired height above the recording medium.

During the initial operation, the contact portion 14 can be used to burnish recording medium 26 to remove asperities to levels below the MR transducer height. To prevent any thermal transient effect or to avoid damaging the MR transducer 18, the MR transducer 18 is located at least about 100 micrometers laterally away from the contact portion 14, preferably at least about 150 micrometers away from the contact portion 14. Positioning the MR transducer 18 away from the contact portion 14 allows the debris generated or accumulated during the burnishing effect to remain away from the MR transducer 18.

A contact slider of the present invention allows the MR transducer 18 to achieve a predictable and significantly reduced physical and magnetic spacing with a rigid recording medium 26 without resulting in thermal asperities. The spacing between the MR transducer 18 and the recording medium 26 is determined by many factors such as a slider pitch angle, a slider roll angle, a dynamic pitch response, and radius of curvature of the slider. Any of these factors can be adjusted to achieve a desired spacing between the recording medium 26 and the MR transducer 18. Preferably the MR transducer 18 is from about 1 nm to about 10 nm above the recording medium 26, more preferably from about 1 nm to about 5 nm, and most preferably from about 1 nm to about 2 nm. By reducing the effective distance between the MR head and the recording medium, the present invention provides a recording system that has a high signal to noise ratio. This spacing also prevents the MR transducer 18 from physically coming in contact with the recording medium 26, even if there are some asperities present in the recording medium 26. In addition, because the invention utilizes a contact slider, the spacing is achieved without having to employ expensive manufacturing and assembly techniques. Moreover, the present invention eliminates or reduces manufacturing tolerances.

Since the recording mechanism of the present invention does not involve a direct contact between the MR transducer 18 and the recording medium 26, thermal transients are eliminated, or significantly reduced to the extent that thermal variations are insulated from the transducer by the slider body material, or other insulating materials which can be deposited between the contact portion 14 and the MR transducer 18. Useful insulating materials include alumina.

Unlike other currently available MR transducer sliders, the slider 10 of the present invention is not designed to "fly" above the recording medium 26. But rather the contact portion 14 of the slider 10 is designed to be in contact with the recording medium 26, i.e., the slider 10 actually contacts the recording medium 18 even when the recording medium 18 is spinning. This contact between the slider 10 and the recording medium 26 results in a significant reduction of height variation between the MR transducer 18 and the recording medium 26 compared to flying head recording mechanisms. The height variation between the slider 10 and the recording medium 26 in the present invention is reduced by at least about 50% compared to a non-contact or flying recording heads. And because the slider 10 does not fly above the recording medium 26, the recording system of the present invention is significantly less sensitive to gram load, altitude, and static attitude compared to flying head recording mechanisms.

The spinning recording medium 26 creates an air movement around the slider 10 which can cause the slider to be lifted above the recording medium 18. To prevent this "flying" of the slider 10, the slider contact force is kept at a level such that a substantially constant contact is maintained between the slider 10 and the recording medium 26 during the normal operation of the recording system. Preferably, for a recording system having the recording medium spinning at about 5400 rpm, the slider contact force is from about 100 mg to about 500 mg, more preferably from about 100 mg to about 300 mg, and most preferably from about 100 mg to about 200 mg.

The slider 10 can also have a thin film transducer (e.g., an inductive head) to allow writing of magnetic information on the recording medium 26. Presence of both an MR and a thin film transducer provides a magnetic recording system which can read and write desired information on the recording medium.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A contact slider having an air-bearing surface comprising a contact portion and a magneto-resistive transducer, wherein said contact portion is in a substantially continuous contact with a recording medium when the recording medium is spinning in operation, a contact force between said contact portion and said recording medium when said recording medium is spinning is less than about 500 mg, and a static friction force between said contact portion and said recording medium is less than about 4 g.

2. The contact slider of claim 1, wherein said magneto-resistive transducer is located from about 1 nm to about 10 nm above the recording medium.

3. The contact slider of claim 1, wherein said contact portion provides a burnishing effect to remove at least a portion of disk asperities to levels below said magneto-resistive transducer height.

4. The contact slider of claim 3, wherein said magneto-resistive transducer is located laterally away from said contact portion such that a substantial portion of any debris generated and/or accumulated by the burnishing effect of said contact portion is located away from said magneto-resistive transducer.

5. A contact slider having an air-bearing surface comprising a contact portion and a magneto-resistive transducer, wherein said air-bearing surface has a radius of curvature of from about 4 meters to about 7 meters, and wherein said contact portion is in a substantially continuous contact with a recording medium when the recording medium is spinning in operation, and a static friction between said contact portion and said recording medium is less than about 4 g.

6. The contact slider of claim 5, wherein said magneto-resistive transducer is located from about 1 nm to about 10 nm above the recording medium.

7. The contact slider of claim 5, wherein a contact force between said contact portion and said recording medium when said recording medium is spinning is less than about 500 mg.

8. A contact slider having an air-bearing surface comprising a contact portion and a magneto-resistive transducer, wherein said contact portion provides a burnishing effect to remove at least a portion of disk asperities to levels below said magneto-resistive transducer height using a contact force of less than about 500 mg, and said magneto-resistive transducer is located laterally away from said contact portion such that a substantial portion of any debris generated and/or accumulated by the burnishing effect of said contact portion is located away from said magneto-resistive transducer.

9. The contact slider of claim 8, wherein said contact portion is curved.

10. A hard disk drive assembly, comprising:
    a medium;
    spin motor means for rotating said medium;
    a head positioned adjacent to said medium, said head having a bottom surface; and
    a contact slider located at said bottom surface of said head, said contact slider having an air-bearing surface comprising a contact portion and a magneto-resistive transducer, wherein said contact portion is in a substantially continuous contact with said medium and said magneto-resistive transducer is above said medium when said medium is spinning in operation, a contact force between said contact portion and said medium when said medium is spinning in operation is less than about 500 mg, and a static friction force between said contact portion and said medium is less than about 4 g.

11. The assembly of claim 10, wherein said contact portion provides a burnishing effect to remove at least a portion of asperities present in said medium to levels below the height of said magneto-resistive transducer.

12. The assembly of claim 11, wherein said magneto-resistive transducer is located laterally away from said contact portion such that a substantial portion of any debris generated and/or accumulated by the burnishing effect of said contact portion is located away from said magneto-resistive transducer.

13. The assembly of claim 10, wherein said magneto-resistive transducer is located from about 1 nm to about 10 nm above said medium.

14. A method for transferring information with a rotating magnetic disk, comprising the steps of:
    (a) positioning a head adjacent to a rotating magnetic disk, said head comprising a contact slider having an air-bearing surface comprising a contact portion and a magneto-resistive transducer, wherein said contact portion is in a substantially continuous contact with said magnetic disk and a contact force between said contact portion and said magnetic disk is less than about 500 mg, said contact portion provides a burnishing effect to remove at least a portion of asperities present in said magnetic disk to levels below the height of said magneto-resistive transducer, and said magneto-resistive transducer is located laterally away from said contact portion such that a substantial portion of any debris generated and/or accumulated by the burnishing effect of said contact portion is located away from said magneto-resistive transducer; and
    (b) sensing a magnetic field of said magnetic disk with said magneto-resistive transducer.

15. The method of claim 14, wherein said air-bearing surface is highly curved in a longitudinal direction.

16. The method of claim 15, wherein said air-bearing surface is highly curved in a lateral direction.

17. A method for transferring information with a rotating magnetic disk, comprising the steps of:
    (a) positioning a head adjacent to a rotating magnetic disk; said head comprising a contact slider having an air-bearing surface comprising a contact portion and a magneto-resistive transducer, wherein said contact portion is in a substantially continuous contact with said magnetic disk and a contact force between said contact portion and said magnetic disk is less than about 500 mg and a static friction between said contact portion and said magnetic disk is less than about 4 g; and (b) sensing a magnetic field of said magnetic disk with said magneto-resistive transducer.

18. The method of claim 17, wherein said magneto-resistive transducer is placed from about 1 nm to about 10 nm above said magnetic disk.

19. The method of claim 17, wherein said air-bearing surface is highly curved in a longitudinal direction.

20. The method of claim 19, wherein said air-bearing surface is highly curved in a lateral direction.

21. A disk drive, comprising:
a disk that includes a disk surface for storing data; and
a contact slider that includes a leading edge, a trailing edge opposite the leading edge, an air bearing surface between the leading and trailing edges, a contact portion, and a magneto-resistive transducer, wherein the air bearing surface is curved in a longitudinal direction, the contact portion maintains substantially constant contact with the disk surface during read and write operations associated with the disk surface, the transducer is spaced from the disk surface during the read and write operations, and a static friction force between the contact portion and the disk surface is less than about 4 g.

22. The disk drive of claim 21, wherein a contact force between the contact portion and the disk surface during the read and write operations is less than about 500 mg.

23. The disk drive of claim 21, wherein a contact force between the contact portion and the disk surface during the read and write operations is from about 100 mg to about 500 mg.

24. The disk drive of claim 21, wherein a contact force between the contact portion and the disk surface during the read and write operations is from about 100 mg to about 300 mg.

25. The disk drive of claim 21, wherein a contact force between the contact portion and the disk surface during the read and write operations is from about 100 mg to about 200 mg.

26. The disk drive of claim 21, wherein the static friction force between the contact portion and the disk surface is less than about 3 g.

27. The disk drive of claim 21, wherein the static friction force between the contact portion and the disk surface is less than about 2 g.

28. The disk drive of claim 21, wherein a contact force between the contact portion and the disk surface during the read and write operations less than about 500 mg, and the static friction force between the contact portion and the disk surface is less than about 2 g.

29. The disk drive of claim 21, wherein a contact force between the contact portion and the disk surface during the read and write operations is from about 100 mg to about 500 mg, and the static friction force between the contact portion and the disk surface is less than about 2 g.

30. The disk drive of claim 21, wherein a contact force between the contact portion and the disk surface during the read and write operations is from about 100 mg to about 300 mg, and the static friction force between the contact portion and the disk surface is less than about 2 g.

31. The disk drive of claim 21, wherein a contact force between the contact portion and the disk surface during the read and write operations is from about 100 mg to about 200 mg, and the static friction force between the contact portion and the disk surface is less than about 2 g.

32. The disk drive of claim 21, wherein the air bearing surface includes a recess between and spaced from the leading edge and the transducer.

33. The disk drive of claim 21, wherein the air bearing surface is devoid of a recess between the leading and trailing edges.

34. The disk drive of claim 21, wherein the air bearing surface has a radius of curvature in the longitudinal direction of about 4 meters to about 7 meters.

35. The disk drive of claim 21, wherein the air bearing surface has a radius of curvature in the longitudinal direction of about 4 meters to about 6 meters.

36. The disk drive of claim 21, wherein the air bearing surface has a radius of curvature in the longitudinal direction of about 5 meters.

37. The disk drive of claim 21, wherein the air bearing surface is curved in a lateral direction.

38. The disk drive of claim 21, wherein the air bearing surface includes two side rails.

39. The disk drive of claim 21, wherein the air bearing surface includes a center rail.

40. The disk drive of claim 21, wherein the air bearing surface includes two side rails and a center rail.

41. The disk drive of claim 21, wherein the air bearing surface is devoid of side rails.

42. The disk drive of claim 21, wherein the transducer is located about 1 nm to about 10 nm above the disk surface during the read and write operations.

43. The disk drive of claim 21, wherein the transducer is located about 1 nm to about 5 nm above the disk surface during the read and write operations.

44. The disk drive of claim 21, wherein the transducer is located about 1 nm to about 2 nm above the disk surface during the read and write operations.

45. The disk drive of claim 21, wherein the transducer is laterally disposed between and spaced from a longitudinal centerline of the slider and a longitudinal edge of the slider.

46. The disk drive of claim 45, wherein the transducer is closer to the longitudinal edge than to the longitudinal centerline.

47. The disk drive of claim 21, wherein the transducer is laterally spaced at least 100 micrometers from the contact portion.

48. The disk drive of claim 21, wherein the contact portion is a single continuous edge.

49. The disk drive of claim 21, wherein the contact portion is asymmetrically disposed in a lateral direction with respect to a longitudinal centerline of the slider.

50. The disk drive of claim 21, wherein the contact portion is devoid of a write transducer.

51. A disk drive, comprising:
a disk that includes a disk surface for storing data; and
a contact slider that includes a leading edge, a trailing edge opposite the leading edge, an air bearing surface between the leading and trailing edges, a contact portion between the leading and trailing edges, and a magneto-resistive transducer, wherein the air bearing surface is highly curved in both a longitudinal and a lateral direction, the contact portion maintains substantially constant contact with the disk surface during read and write operations associated with the disk surface, the transducer is spaced from the disk surface during the read and write operations, and a static friction force between the contact portion and the disk surface is less than about 4 g.

52. The disk drive of claim 51, wherein the slider has a spherical shape.

53. The disk drive of claim 51, wherein the air bearing surface includes a recess between and spaced from the leading edge and the transducer.

54. The disk drive of claim 51, wherein the air bearing surface is devoid of a recess between the leading and trailing edges.

55. The disk drive of claim 51, wherein the static friction force between the contact portion and the disk surface is less than about 2 g.

56. The disk drive of claim 51, wherein a contact force between the contact portion and the disk surface during the read and write operations is from about 100 mg to about 200 mg.

57. The disk drive of claim 51, wherein the air bearing surface has a radius of curvature in the longitudinal direction of about 4 meters to about 7 meters.

58. The disk drive of claim 51, wherein the transducer is located about 1 nm to about 2 nm above the disk surface during the read and write operations.

59. The disk drive of claim 51, wherein the transducer is laterally spaced at least 100 micrometers from the contact portion.

60. A disk drive, comprising:

a disk that includes a disk surface for storing data; and a contact slider that includes a leading edge, a trailing edge opposite the leading edge, an air bearing surface between the leading and trailing edges, a contact portion between the leading and trailing edges, and a magneto-resistive transducer, wherein the air bearing surface is highly curved in both a longitudinal and lateral direction, the contact portion maintains substantially constant contact with the disk surface during read and write operations associated with the disk surface, the transducer is spaced from the disk surface during the read and write operations, a static friction force between the contact portion and the disk surface is less than about 4 g, a contact force between the contact portion and the disk surface during the read and write operations is less than about 500 mg, the air bearing surface has a radius of curvature in the longitudinal direction of about 4 meters to about 7 meters, and the transducer is located about 1 nm to about 10 nm above the disk surface during the read and write operations.

* * * * *